(No Model.)

E. EGGER & F. A. WESSEL.
AUTOMATIC BELT REGULATOR.

No. 518,314. Patented Apr. 17, 1894.

Witnesses
W. A. Courtland
Levadia M. Lennan.

Inventors
Ernst Egger
Ferdinand A. Wessel
By their Attorney,
Edward P. Thompson

UNITED STATES PATENT OFFICE.

ERNST EGGER AND FERDINAND A. WESSEL, OF NEW YORK, N. Y., ASSIGNORS OF ONE-FOURTH TO AARON NAUMBURG, OF SAME PLACE.

AUTOMATIC BELT-REGULATOR.

SPECIFICATION forming part of Letters Patent No. 518,314, dated April 17, 1894.

Application filed May 17, 1893. Serial No. 474,511. (No model.)

*To all whom it may concern:*

Be it known that we, ERNST EGGER, a subject of the Emperor of Austria-Hungary, and FERDINAND A. WESSEL, a citizen of the United States of America, residing at New York, in the county and State of New York have invented certain new and useful Improvements in Automatic Belt-Regulators, (Case No. 3,) of which the following is a specification.

One of the difficulties in connection with driving belts for machinery is the slipping of the belt upon variations of load, or speed. When the load increases the tension of one side of the belt becomes greater while the other becomes slack. By our invention we overcome this difficulty by utilizing this increase of tension, whereby we produce an increase of friction of the belt on the pulleys.

The invention is described in full by reference to the accompanying drawings.

Figure 1:
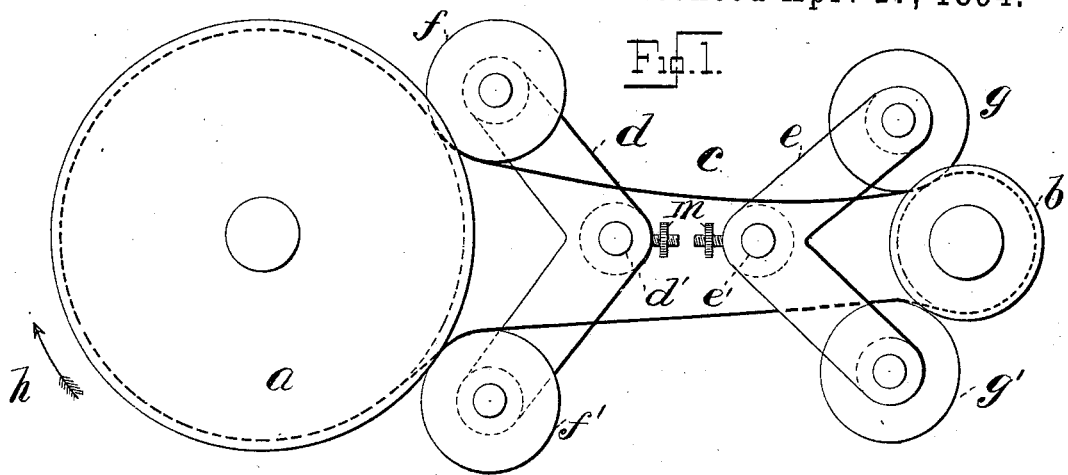
Figure 2:
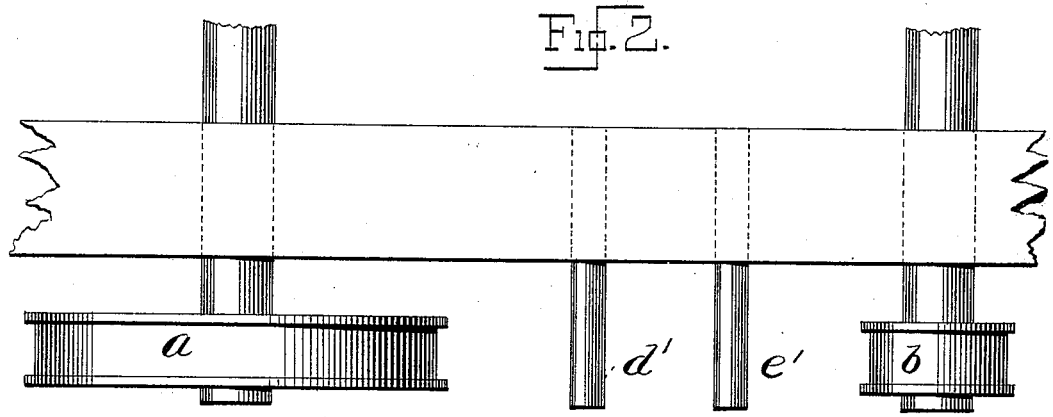
Figure 3:
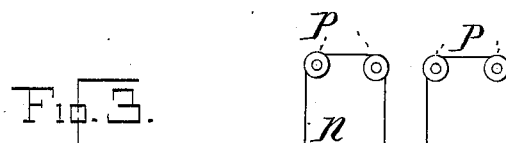
Figure 3:
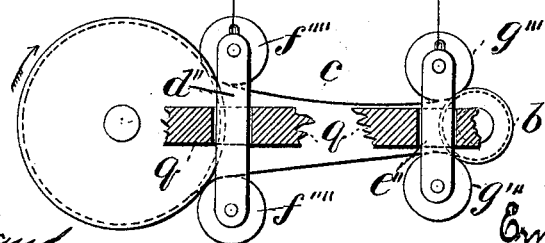

Figure 1 is a front elevation of the complete device embodying the invention. Fig. 2 is a plan of that shown in Fig. 1, except that some parts are partly broken away or entirely omitted. Fig. 3 is a similar view to Fig. 1 of a modification.

The device embodying the invention consists of the combination with pulleys $a, b$, and with a driving belt $c$, located upon and connecting said pulleys, of bent levers $d, e$, pivoted upon stationary pins $d', e'$, located between said pulleys, rollers $f, f'$, carried upon arms of the lever $d$, and rollers $g, g'$ carried on the arms of the lever $e$, all the rollers bearing upon the belt in the following manner. The rollers $f, f'$, are located upon the outside of the belt and are so close together that the belt is in contact with much more of the periphery of the pulley $a$, than if said rollers were omitted. The same statement is true about the rollers $g, g'$ with regard to the pulley $b$. If the pulleys are not rotating the belt is practically without tension. Suppose the pulley $a$ is rotated;—the direction of the arrow $h$, the lower part of the belt $c$ is brought under tension, pressing the pulleys $g'$ and $f'$ outward; consequently, the pulleys $f$ and $g$ move toward the pulleys $a$ and $b$ pressing the belt $c$ close on the pulleys and producing pressure and friction between the latter and the belt. As the tension of the lower part of the belt increases or decreases the pressure and friction will also vary correspondingly. Therefore, the frictional loss will increase or decrease proportionally with the amount of power to be transmitted.

$m$ is an adjustable weight to counterbalance the weight of the arms $d$ and $e$, and rollers $f$, $f'$ and $g, g'$. The pivots $d', e'$ of the levers $d, e$, are preferably parallel to the axes of the pulleys and lie in the plane which coincides with said axes.

In the modification, shown in Fig. 3, the rollers $f'''', f''''$ and $g''', g'''$ are connected by bars $d''$ and $e''$ which are suspended by flexible cords $n$ passing over guide pulleys $p$ and counterbalanced by weights $m$. Guides $q$ retain the bars $d''$ and $e''$ in their proper position.

The operation is substantially the same. When the lower or taut portion of the belt varies in tension, the weights move accordingly in such a manner that the friction of the belt $c$ upon the pulleys $a, b$, varies in proportion to the tension of the taut portion of the belt.

We claim as our invention—

1. The combination with pulleys and a driving belt connecting the same, of means for automatically varying the pressure of the said belt upon said pulleys proportionally to the increase or decrease of the tension of the taut portion of the belt.

2. The combination, with pulleys and a driving belt connecting the same, of a pair of rollers for each pulley, an independent support for each pair of rollers, each support movable by the action of the taut portion of the belt, all rollers bearing upon said belt, and the rollers on the slack side of the belt bearing through said belt against their respective pulleys.

3. The combination with pulleys and with a driving belt, passing around and connecting the same, of a fulcrum or pivoted support located between the pulleys and between the slack and taut portions of the belt, a lever rotatable about said fulcrum and carrying pulleys or rollers which bear upon that face of the belt opposite the face which is in contact with the first named pulleys, both of said rollers being located substantially at the periphery of one of the first named pulleys, and the said fulcrum being located at a distance from the same pulley.

4. The combination of pulleys $a$ and $b$, a driving belt $c$, connecting the same, levers $d$ and $e$, pivoted upon pins $d'$ and $e'$, which are located between said pulleys, the said levers $d$ and $e$ carrying rollers $f, f'$, and $g, g'$, which rollers bear upon the belt $c$ as herein set forth.

In testimony that we claim the foregoing as our invention we have signed our names, in presence of two witnesses, this 12th day of May, 1893.

ERNST EGGER.
FERDINAND A. WESSEL.

Witnesses:
LEOCADIA M. LENNAN,
WM. A. COURSEN, Jr.